(12) United States Patent
Vergnes et al.

(10) Patent No.: US 7,162,003 B2
(45) Date of Patent: Jan. 9, 2007

(54) METHOD AND APPARATUS FOR DRIVING MULTIPLE PERIPHERALS WITH DIFFERENT CLOCK FREQUENCIES IN AN INTEGRATED CIRCUIT

(75) Inventors: Alain Vergnes, Trets (FR); Olivier Lardy, Aix en Provence (FR)

(73) Assignee: Atmel Corporation, San Jose, CA (US)

( * ) Notice: Subject to any disclaimer, the term of this patent is extended or adjusted under 35 U.S.C. 154(b) by 49 days.

(21) Appl. No.: 11/036,471

(22) Filed: Jan. 13, 2005

(65) Prior Publication Data

US 2005/0165996 A1 Jul. 28, 2005

(30) Foreign Application Priority Data

Jan. 27, 2004 (FR) .................................. 04 00740

(51) Int. Cl.
*H04L 23/00* (2006.01)
(52) U.S. Cl. .................. 375/377; 710/313; 713/600
(58) Field of Classification Search .............. 375/316, 375/377, 354; 713/500, 600; 710/305–306, 710/308, 8, 10, 12, 3, 6, 36, 311, 315, 313
See application file for complete search history.

(56) References Cited

U.S. PATENT DOCUMENTS

| | | | | |
|---|---|---|---|---|
| 5,491,814 A | 2/1996 | Yee et al. | .................... | 395/550 |
| 5,586,308 A | 12/1996 | Hawkins et al. | ............ | 395/556 |
| 5,678,065 A | 10/1997 | Lee et al. | .................... | 395/880 |
| 5,838,931 A * | 11/1998 | Regenold et al. | ........... | 710/306 |
| 5,838,995 A | 11/1998 | Chen et al. | .................. | 395/880 |
| 5,925,133 A | 7/1999 | Buxton et al. | .............. | 713/323 |
| 6,073,244 A | 6/2000 | Iwazaki | ...................... | 713/322 |
| 6,324,653 B1 | 11/2001 | Lisart et al. | ................. | 713/600 |
| 6,345,328 B1 | 2/2002 | Rozario et al. | ............... | 710/52 |
| 6,457,137 B1 | 9/2002 | Mitchell et al. | ............ | 713/400 |
| 6,510,473 B1 | 1/2003 | Voit | ............................. | 710/58 |
| 6,513,126 B1 * | 1/2003 | Huang et al. | ................ | 713/500 |
| 6,564,329 B1 | 5/2003 | Cheung et al. | ............. | 713/322 |
| 6,584,512 B1 * | 6/2003 | Ishibashi | ...................... | 710/22 |
| 6,633,994 B1 | 10/2003 | Hofmann et al. | ........... | 713/600 |
| 6,747,997 B1 * | 6/2004 | Susnow et al. | ............. | 370/509 |
| 6,789,153 B1 * | 9/2004 | Stewart | ....................... | 710/306 |
| 6,912,637 B1 * | 6/2005 | Herbst | ......................... | 711/167 |
| 6,950,956 B1 * | 9/2005 | Zerbe et al. | ................. | 713/400 |
| 2002/0019898 A1 | 2/2002 | Hayashi et al. | ............. | 710/110 |
| 2002/0090046 A1 * | 7/2002 | Meyer et al. | ................ | 375/377 |
| 2002/0162042 A1 * | 10/2002 | Goodrich et al. | ........... | 713/500 |
| 2003/0149826 A1 | 8/2003 | Kadota | ........................ | 710/306 |

FOREIGN PATENT DOCUMENTS

| | | |
|---|---|---|
| DE | 40 30 541 A1 | 9/1990 |
| EP | 0 840 237 A1 | 10/1997 |

* cited by examiner

*Primary Examiner*—Jean B. Corrielus
(74) *Attorney, Agent, or Firm*—Sierra Patent Group, Ltd.

(57) ABSTRACT

The invention is a system for selecting a peripheral, the peripheral receiving a first clock frequency. The invention comprises the following. A processing circuit receives a second clock frequency, where the first and second clock frequencies are different. The processing circuit is configured to transmit a select signal. A bridge circuit is coupled to the processing circuit and the peripheral, and is configured to receive the select signal and transmit a peripheral select signal to the peripheral. The bridge circuit is further configured to receive the second clock frequency but not the first clock frequency. A counter is coupled to the bridge circuit and is configured to process a count, the count being a predetermined number and based on the value of the first frequency.

17 Claims, 7 Drawing Sheets

METHOD AND APPARATUS FOR DRIVING MULTIPLE PERIPHERALS WITH DIFFERENT CLOCK FREQUENCIES IN AN INTEGRATED CIRCUIT

CROSS-REFERENCE TO RELATED APPLICATIONS

This application claims priority to French Application Serial Number 04 00740, filed Jan. 27, 2004, the entirety of which is incorporated by reference herein.

BACKGROUND (1) Field of the Invention

The invention relates to clock frequencies in peripheral devices and more particularly to running a peripheral device (slave) at a clock frequency different than that of a microprocessor (master), without using clock resynchronization.

(2) Prior Art

A microcontroller generally includes a microprocessor, memory, a peripheral module that provides communication, for example Universal Asynchronous Receiver/Transmitter (UART), SPI, and USB, and an interrupt controller. Peripherals are generally configured to exchange data with microprocessors through internal buses. A bus typically conveys data, address and control signals. One method of handling data buses for multiple peripherals is by multiplexing the signal.

FIG. 1 is schematic illustrating a prior art simplified microcontroller with system bus. Microcontroller 100 includes microprocessor 102 coupled to peripherals 104 and 106. The address bus, write data bus and read/write signal are combined for simplicity in system bus 108. System bus 108 includes multiplexer 110 that selects between data from peripherals 104 and 106.

FIG. 2 is a schematic illustrating a prior art simplified microcontroller with individual bus lines. Microcontroller 200 includes microprocessor 202 connected to memory 204. Address decoder 206 receives and decodes addresses from microprocessor 202 for memory 204 and peripherals 208-1 and 208-2. External bus interface 209 connects to microprocessor 202 through system address bus 210, system read/write 212 and system data bus 214. External bus interface 209 enables microcontroller 200 to interface to external components (not shown).

Address decoder 206 receives and decodes an address from system address bus 210, and issues a select signal on bridge select line 215 to bridge circuit 216, which then selects between peripheral 208-1 and 208-2. Bridge select logic 216 coordinates bus signals from system address bus 210, system read/write bus 212, and system data bus 214 with peripherals 208. Bridge circuit 216 also translates the protocol of the system bus into protocol for the peripheral bus. Bridge circuit 216 interfaces with peripheral 208-1 through peripheral bus 218-1 and with peripheral 208-2 through peripheral bus 218-2. Communication between microprocessor 202, bridge circuit 216 and peripheral 208-1 is coordinated by a clock signal from clock source 220 (also received by memory 204, address decoder 206, and external bus interface 209).

Peripheral 208-2 receives a clock signal from clock source 222, which differs from clock source 220. Bridge circuit 216 receives clock source 222 and resynchronizes signals between microprocessor 202, which operates at the timing of clock source 220, and peripheral 208-2. In order to resynchronize, microcontroller 200 duplicates some parts of the bus (particularly the address bus), which in turn requires more power.

What is needed is a method and system for resynchronizing signals between peripherals at different clock frequencies that uses fewer components and reduce power consumption.

SUMMARY OF THE INVENTION

The invention consists of determining a count value for a circuit wherein the count (three, four, five, etc.) represents the ratio of system clock frequency to a peripheral clock frequency (2-1, 3-1, 4-1, etc.). The count allows the system to run a peripheral at a clock frequency different from the system clock frequency without resynchronizing the peripheral clock frequency.

The invention is a system for selecting a peripheral, the peripheral receiving a first clock frequency. The invention comprises the following. A processing circuit receives a second clock frequency, where the first and second clock frequencies are different. The processing circuit is configured to transmit a select signal. A bridge circuit is coupled to the processing circuit and the peripheral, and is configured to receive the select signal and transmit a peripheral select signal to the peripheral. The bridge circuit is further configured to receive the second clock frequency but not the first clock frequency. A counter is coupled to the bridge circuit and is configured to process a count, the count being a predetermined number and based on the value of the first frequency.

DETAILED DESCRIPTION OF THE INVENTION

Figure 1:
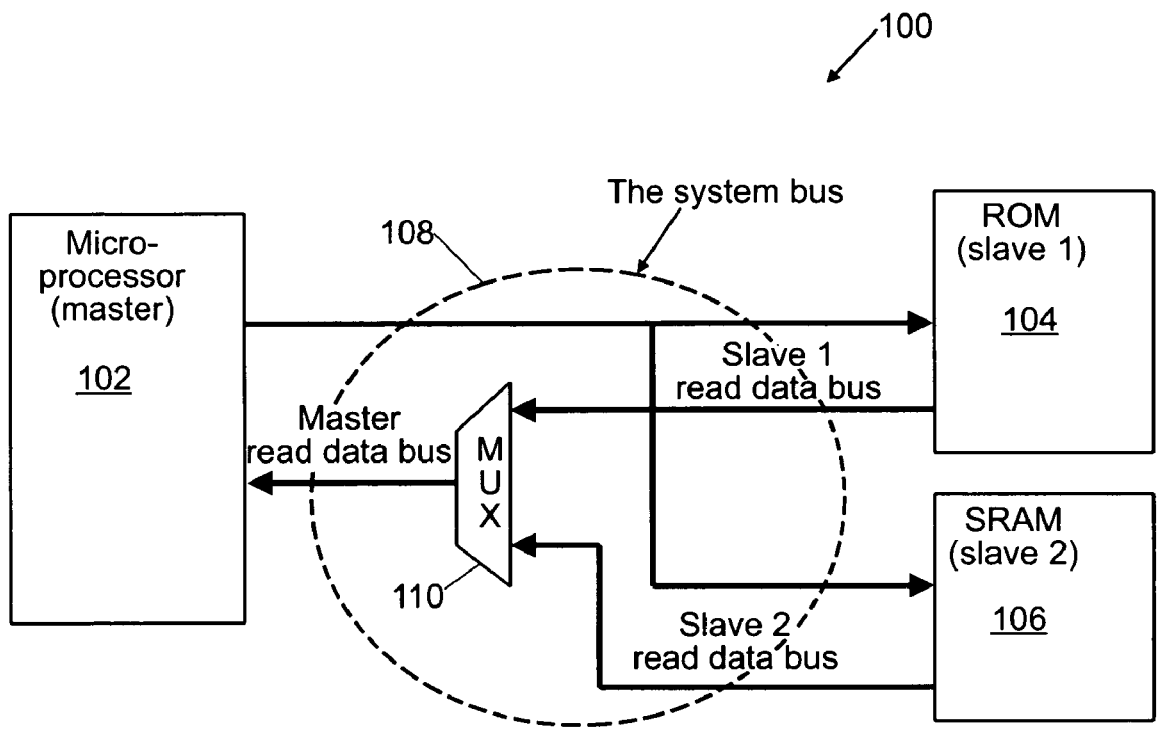
FIG. 1 is schematic illustrating a prior art simplified microcontroller with system bus.
Figure 2:
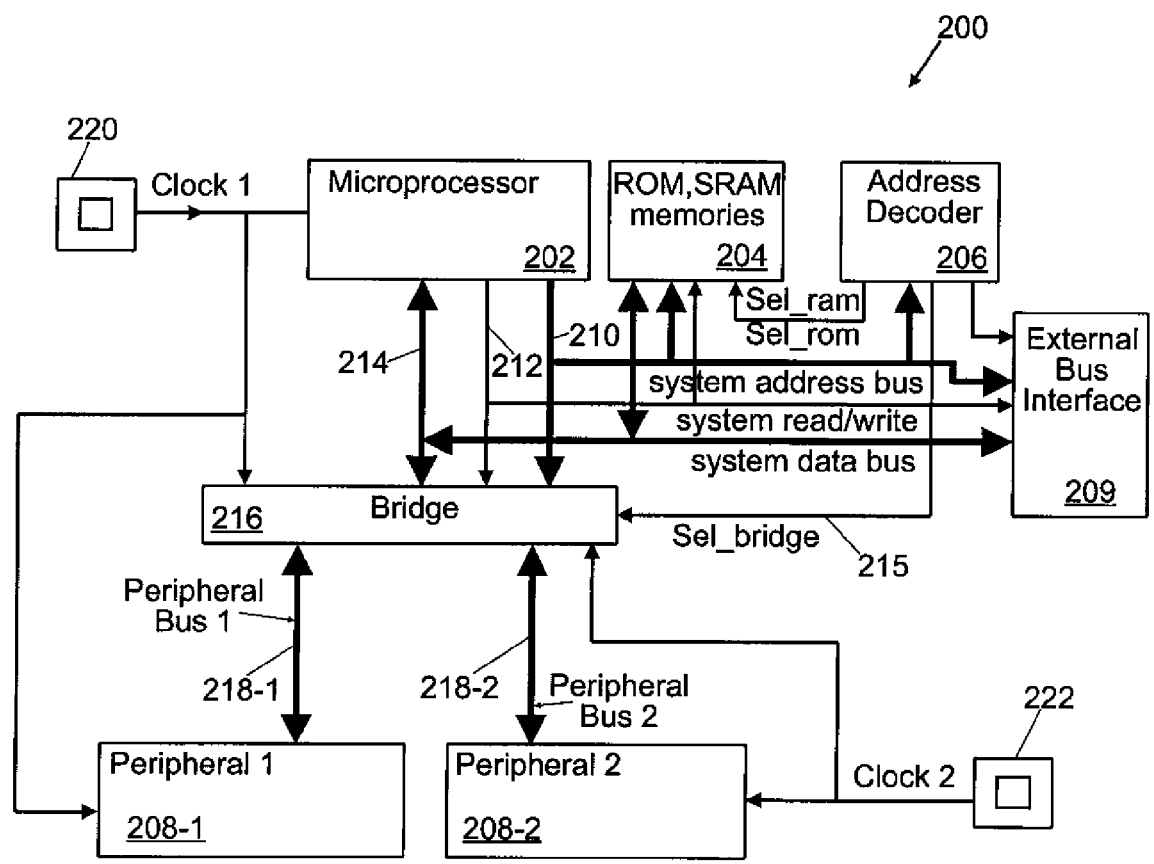
FIG. 2 is a schematic illustrating a prior art simplified microcontroller with individual bus lines.
Figure 3:
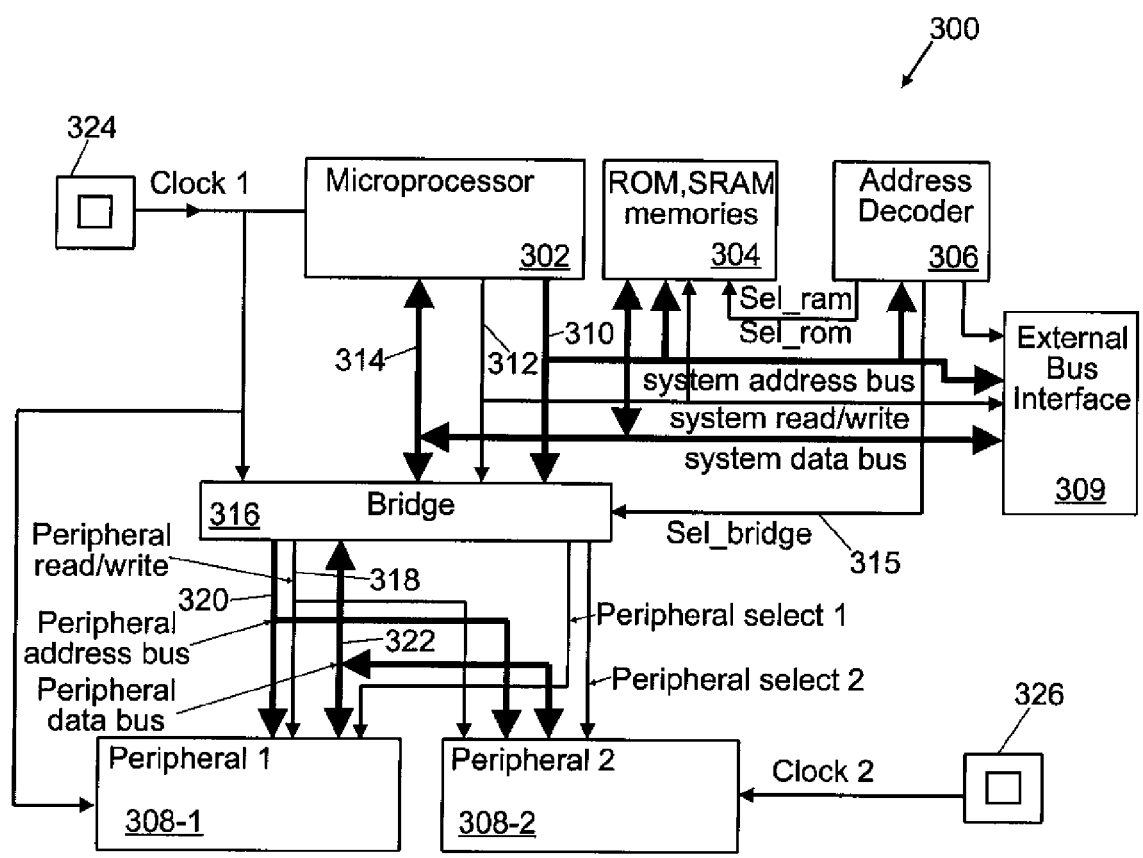
FIG. 3 is a schematic illustrating one embodiment of the invention in a microcontroller.

FIG. 3 is a schematic illustrating one embodiment of the invention in a microcontroller. Microcontroller 300 includes a processing circuit, or microprocessor 302, connected to memory 304. Address decoder 306 receives and decodes addresses from microprocessor 302 for memory 304 and peripherals 308-1 and 308-2. External bus interface 309 connects to microprocessor 302 through system address bus 310, system read/write 312 and system data bus 314. External bus interface 309 enables microcontroller 300 to interface to external components (not shown).

Address decoder 306 receives and decodes an address from system address bus 310, and issues a select signal on bridge select line 315 to bridge circuit 316, which then selects between peripheral 308-1 and 308-2. Bridge circuit 316 interfaces with peripherals 308 through peripheral read/ write bus 318, peripheral address bus 320, and peripheral data bus 322. Bridge circuit 316, microprocessor 302 and peripheral 308-1 receive a clock signal from clock source 324. A clock signal to memory 304, address decoder 306 and external bus 309 is not illustrated for simplicity.

Peripheral 308-2 receives a clock signal from clock source 326, which differs from clock source 324. Bridge circuit 316 does not need to receive clock source 326 in order to resynchronize signals between microprocessor 302, which operates at the timing of clock source 324, and peripheral 308-2. In one embodiment, the ratio of clock frequency from clock source 324 to clock source 326 is known and stored in or available to bridge circuit 316.

Figure 4:
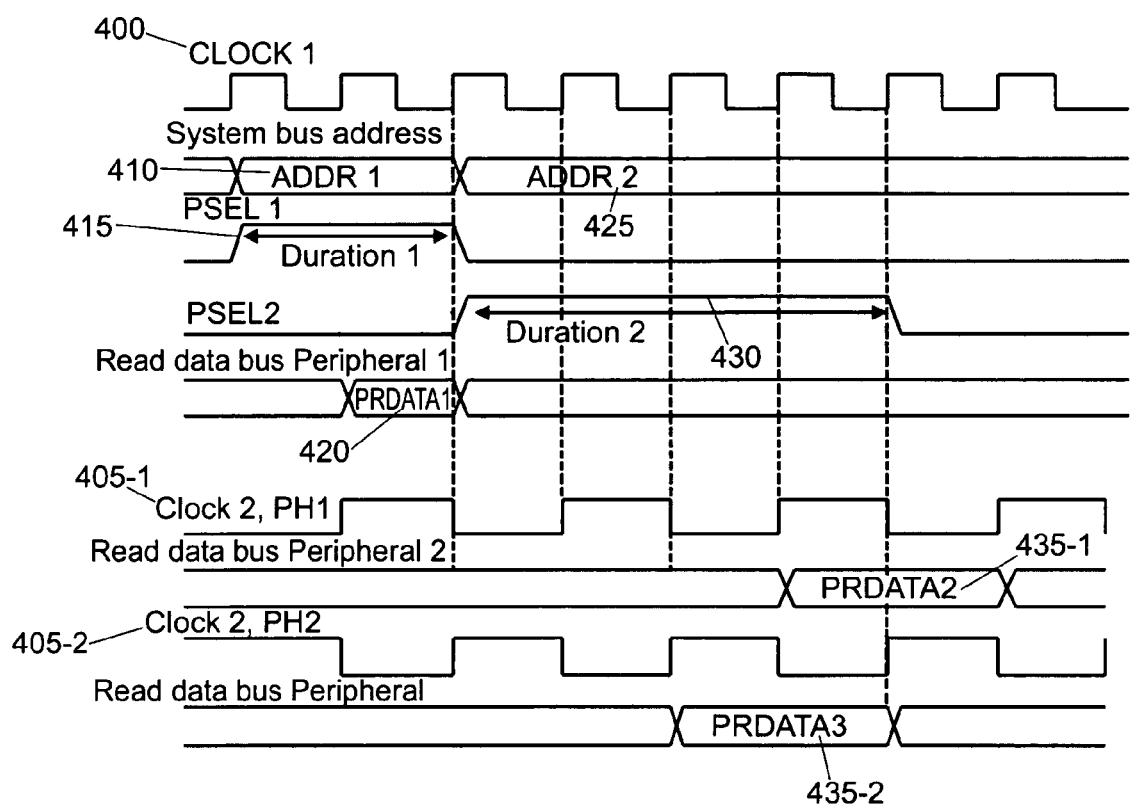
FIG. 4 is a timing diagram illustrating operation of the invention at two different clock frequencies.

FIG. 4 is a timing diagram illustrating operation of the invention at two different clock frequencies. Clock 400, from, for example, clock 324 of FIG. 3, is twice the rate of clock 405, from, for example, clock 326 of FIG. 3. Although a ratio of 2-1 is used in this example, the ratio is only dependent on the clock speeds at which the system and peripherals operate.

Microprocessor 302 from FIG. 3 sends an address corresponding to peripheral 308-1 along system address bus 310. As soon as bridge circuit 316 receives an address, for example address 410 (corresponding to peripheral 308-1), bridge circuit 316 transmits peripheral select signal 415 to peripheral 308-1. For example, in the Advanced Microcontroller Bus Architecture (AMBA), proposed by ARM, the select signal is asserted for two clock cycles while the setup time for the peripheral is one clock cycle. AMBA is used as an example only to illustrate operation of the invention, not as a limiting feature. Because peripheral 308-1 and microprocessor 302 share the same clock frequency from clock source 324, one clock cycle of clock 400 passes before read data 420 is available from peripheral 308-1.

Next, microprocessor 302 sends an address corresponding to peripheral 308-2 along system address bus 310. As soon as bridge circuit 316 receives the address, for example address 425 (corresponding to peripheral 308-2), bridge circuit 316 transmits peripheral select signal 430 to peripheral 308-2. Because the ratio of clock 400 to clock 405 is 2-1, peripheral select signal 430 lasts four cycles of clock 400 and two cycles of clock 405.

The time at which read data 435 becomes available from peripheral 308-2 depends on how the rising and falling edges of clock 405 compares to the rising and falling edges of clock 400. For example, with clock 405-1, read data 435-1 becomes available one and a half clock cycles after peripheral select signal 430 is asserted. Alternatively, read data could become available at one-half of a clock cycle after peripheral select signal 430 is asserted.

With respect to clock 405-2, read data 435-2 becomes available one clock cycle after peripheral select signal 430 is asserted, on the rising edge of clock 405-2.

The duration of the peripheral select depends on the peripheral selected. The bridge circuit determines the number of clock cycles, based on a known ratio, and counts based on its input clock. The ratio, or number of clock cycles that need to pass, may be hardwired into the bridge circuit or provided through an external source.

Figure 5:
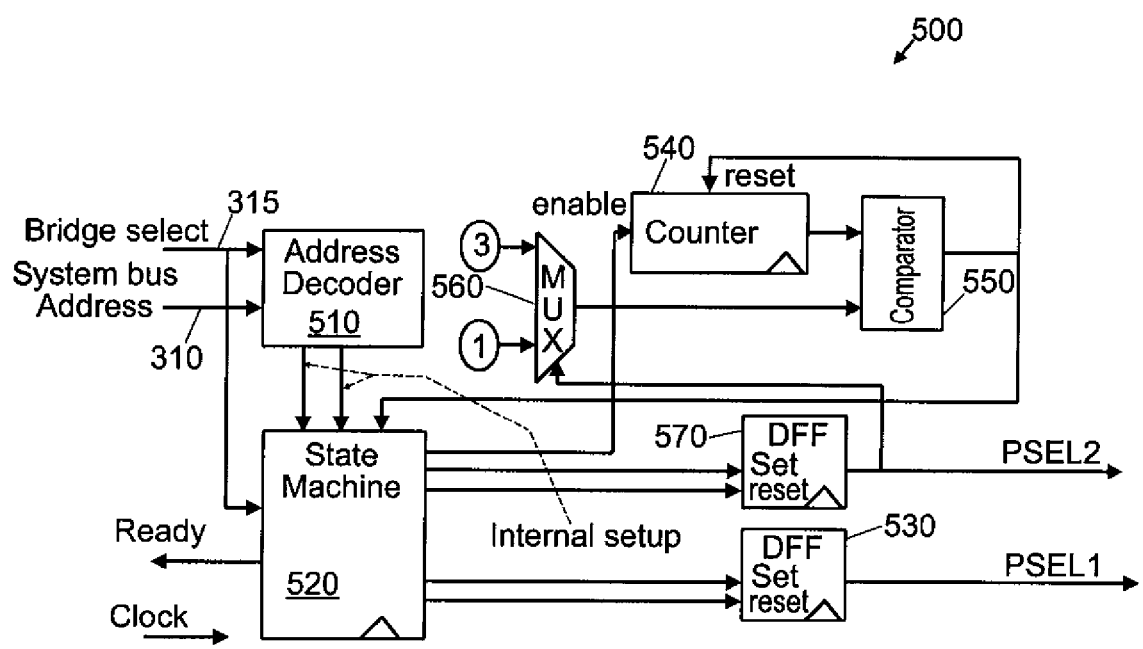
FIG. 5 is a schematic illustrating one embodiment of bridge circuit from FIG. 3.

FIG. 5 is a schematic illustrating one embodiment of bridge circuit 316 from FIG. 3. FIG. 5 simplifies the bridge circuit circuitry by illustrating only the components related to the invention. Bridge circuit 500 includes address decoder 510 that receives an address from system address bus 310 and a bridge select signal from bridge select line 315. Address decoder 510 decodes the address and bridge select, and sends a select signal to state machine 520. State machine 520 receives, for example, a signal indicating that peripheral 308-1 should be asserted. State machine 520 asserts a set signal on D flip-flop (DFF) 530, which asserts the peripheral select signal for peripheral 308-1. State machine 520 also sends an enable signal to counter 540. In this example counter 540 is an incrementing counter, though a decrementing counter could be substituted with other appropriate changes. The first clock cycle after the counter is enabled, the counter reads zero. At this point, peripheral 308-1 has made read data 420 (see FIG. 4) available. Comparator 550 compares the value from counter 540 (a zero at this time) with a count from multiplexer 560, which provides a default value of one. Since the numbers differ, comparator 550 takes no action. After the next clock cycle, read data 420 has been available one clock cycle and counter increments its value to one. Comparator 550 identifies that the value from counter 540 (one) equals the count from multiplexer 560 (one), therefore comparator 550 sends a reset signal to counter 540 and informs state machine 520. The reset signal sent to counter 540 stops the count and resets the value to zero. State machine 520 resets DFF 530, which deasserts peripheral 308-1, and sends a ready signal to microprocessor 302 indicating that bridge circuit 500 is ready to proceed.

In the next example, state machine 520 receives a signal indicating that peripheral 308-2 should be asserted. State machine 520 asserts a set signal on D flip-flop (DFF) 570, which asserts the peripheral select signal for peripheral 308-2. State machine 520 also sends an enable signal to counter 540. DFF 570 also asserts a select signal at multiplexer 560. Multiplexer 560 transmits a value of 3 to comparator 550. One of ordinary skill in the art recognizes that the count transmitted by multiplexer 560 depends on the architecture used and the ratio between the clock frequencies. In this example, multiplexer 560 provides a count of one and three, consistent with AMBA architecture and a 2-1 ratio. The count will vary with different ratios and different architectures. In this example, as long as DFF 570 is asserted, multiplexer 560 will provide a count of three.

Four clock cycles after state machine 520 sets DFF 570, counter 540 increments to a value of three and comparator 550 resets counter 540 and informs state machine 520 of the completion. State machine 520 then resets DFF 570, which in turn deasserts multiplexer 560. State machine 520 also transmits a ready signal to microprocessor 302. Peripheral select 430 was asserted for four clock cycles, based on clock 400, or two clock cycles based on clock 405.

Figure 6:
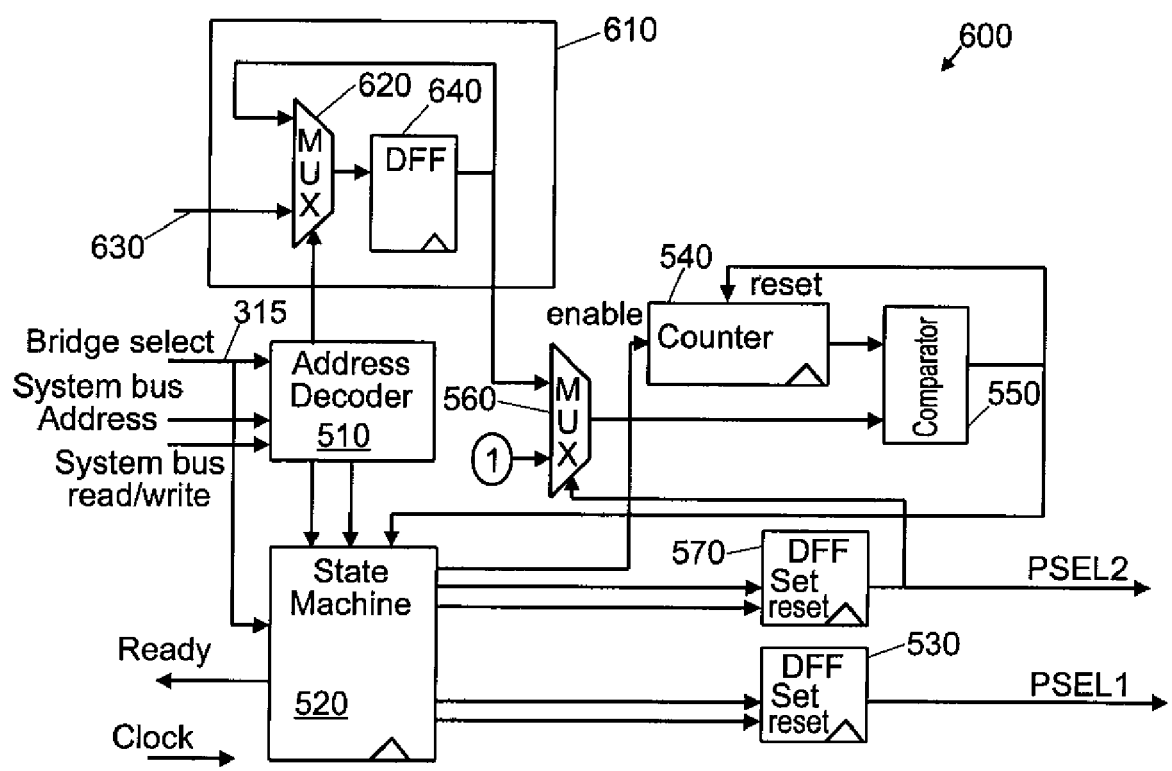
FIG. 6 is a schematic illustrating one embodiment of bridge circuit from FIG. 3.

FIG. 6 is a schematic illustrating one embodiment of bridge circuit 316 from FIG. 3. Bridge circuit 600 includes the components of bridge circuit 500 and the components operate in the same manner. Additionally, address decoder 510 receives a system bus read/write signal and transmits a select signal to configuration register 610. Rather than multiplexer 560 receiving a fixed count when asserted by DFF 570, multiplexer 560 receives a count from configuration circuit 610.

Address decoder 510 sends a select signal to multiplexer 620, which then selects the ratio for the count from system data bus 630. Multiplexer 620 transmits the ratio to DFF 640, which in turn transmits the ratio to multiplexers 560 and 620. Once address decoder 510 deselects multiplexer 620, multiplexer 620 selects the count from DFF 640, and the count is recycled between multiplexer 620 and DFF 640. Configuration register 610 provides a configurable count for peripherals with different or varying clock frequencies.

Figure 7:
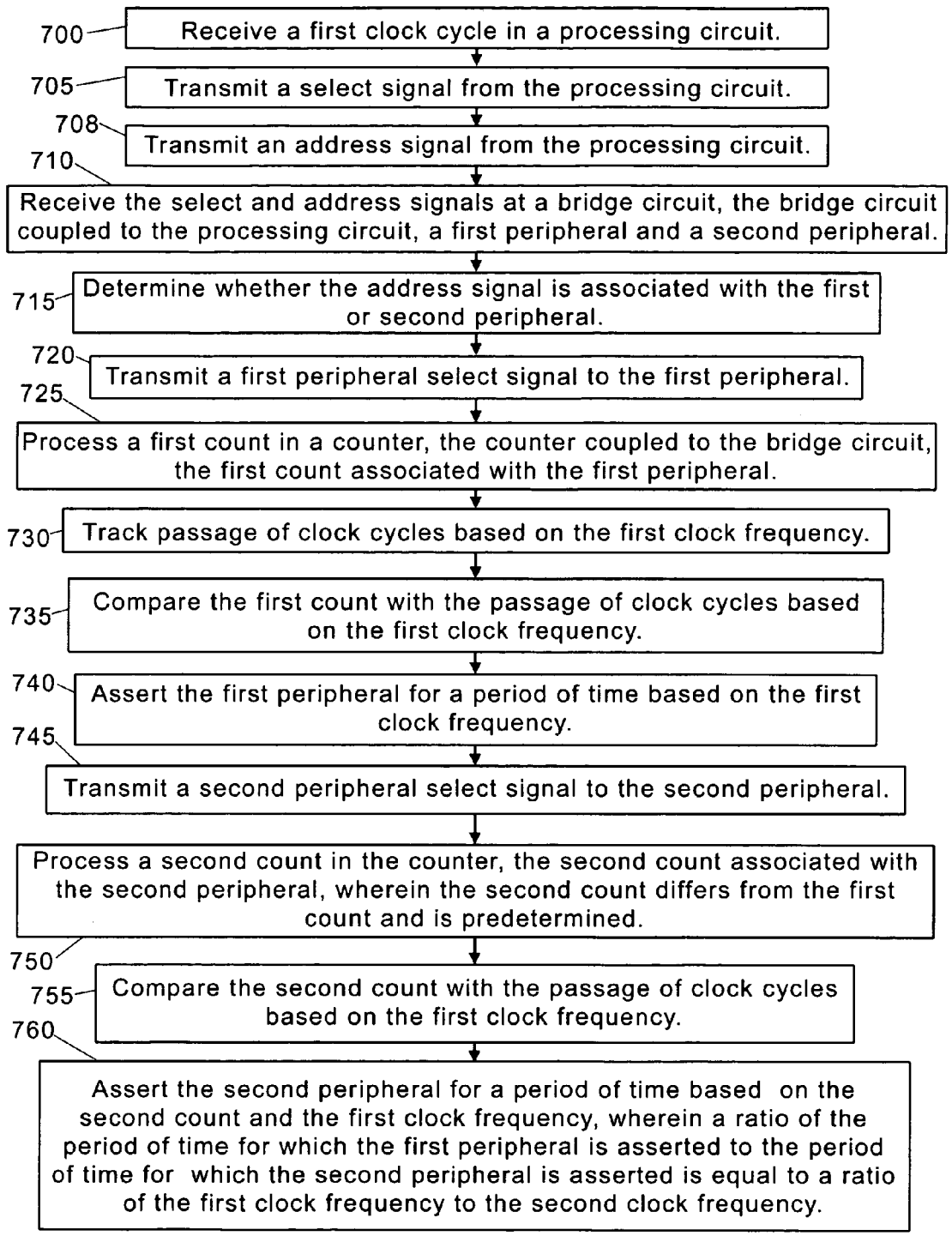
FIG. 7 is a flow diagram illustrating a method for driving multiple peripherals with different clock frequencies.

FIG. 7 is a flow diagram illustrating a method for driving multiple peripherals with different clock frequencies. In block 700, receive a first clock cycle in a processing circuit.

In block 705, transmit a select signal from the processing circuit. In block 708, transmit an address signal from the processing circuit. In block 710, receive the select and address signals at a bridge circuit, the bridge circuit coupled to the processing circuit, a first peripheral and a second peripheral. In block 715, determine whether the address signal is associated with the first or second peripheral. In block 720, transmit a first peripheral select signal to the first peripheral. In block 725, process a first count in a counter, the counter coupled to the bridge circuit, the first count associated with the first peripheral. In block 730, track passage of clock cycles based on the first clock frequency. In block 735, compare the first count with the passage of clock cycles based on the first clock frequency. In block 740, assert the first peripheral for a period of time based on the first count and the first clock frequency. In block 745, transmit a second peripheral select signal to the second peripheral. In block 750, process a second count in the counter, the second count associated with the second peripheral, wherein the second count differs from the first count and is predetermined. In block 755, compare the second count with the passage of clock cycles based on the first clock frequency. In block 760, assert the second peripheral for a period of time based on the second count and the first clock frequency, wherein a ratio of the period of time for which the first peripheral is asserted to the period of time for which the second peripheral is asserted is equal to a ratio of the first clock frequency to the second clock frequency.

The advantages of the invention include reduced circuitry and therefore reduced power requirements, by allowing frequency differences between peripherals or between a peripheral and the system, without resynchronizing.

One of ordinary skill in the art will recognize that multiple masters may be used without straying from the invention. As any person skilled in the art will recognize from the previous description and from the figures and claims that modifications and changes can be made to the invention without departing from the scope of the invention defined in the following claims.

The invention claimed is:

1. A system for selecting a first peripheral and a second peripheral, the first peripheral receiving a first clock frequency and the second peripheral receiving a second clock frequency, the first and second clock frequencies differing, in an integrated circuit including a processing circuit configured to receive the first clock frequency, transmit a select signal and an address signal, comprising:
   a bridge circuit coupled to the processing circuit, the first peripheral and the second peripheral, and configured to receive the select signal and the address signal and transmit a first peripheral select signal to the first peripheral and a second peripheral select signal to the second peripheral, the bridge circuit comprising a counter,
   wherein the counter is configured to process a count, the count being a predetermined number and based on whether the address signal indicates a first address and the select signal indicates that access is required to the first address, which is associated with the first peripheral, or to a second address, which is associated with the second peripheral, wherein the count differs for the first and second addresses, wherein the bridge circuit asserts the first peripheral and the second peripheral for a period of time based on the value of the count.

2. The system of claim 1, the bridge circuit further comprising:
   an address decoder configured to receive the select signal and address signal and determine whether the address signal is associated with the first or second peripheral.

3. The system of claim 2, the bridge circuit further comprising:
   a peripheral select circuit coupled to the address decoder and configured to generate the first peripheral select signal and the second peripheral select signal based on the first or second address signal, wherein if the address signal indicates the first address then the peripheral select circuit asserts the first peripheral for a first number of clock cycles, and if the address signal indicates the second address then the peripheral select circuit asserts the second peripheral for a second number of clock cycles.

4. The system of claim 3 wherein a ratio of the period of time for which the first peripheral is asserted to the period of time for which the second peripheral is asserted is equal to a ratio of the first clock frequency to the second clock frequency.

5. The system of claim 4 wherein the first number of clock cycles equals the second number of clock cycles.

6. The system of claim 3 wherein the count is equal to the number of clock cycles that the peripheral select circuit asserts the first and second peripherals.

7. The system of claim 6 wherein a ratio of the count for asserting the first peripheral to the count for asserting the second peripheral is equal to a ratio of the first clock frequency to the second clock frequency.

8. The system of claim 3, the bridge circuit further comprising:
   a select circuit configured to receive an assert signal from the peripheral select circuit indicating whether the first peripheral or the second peripheral is asserted, the select circuit further configured to select the count based on the assert signal;
   the counter coupled to the select circuit and configured to track passage of a number of clock cycles based on the first clock frequency; and
   a compare circuit coupled to the counter and configured to receive the count and reset the counter, wherein the counter is configured to remain enabled until the counter has tracked passage of a number of clock cycles indicated by the count at which point the compare circuit is configured to transmit a deassert signal that causes the peripheral select circuit to deassert the first or second peripheral.

9. The system of claim 8 wherein a ratio of the number of clock cycles indicated by the count for asserting the first peripheral to the number of clock cycles indicated by the count for asserting the second peripheral is equal to a ratio of the first clock frequency to the second clock frequency.

10. The system of claim 8 further comprising:
    a configuration register coupled to the counter and configured to receive the count for the second address, wherein the count for the first address is based on the number of clock cycles, at the first clock frequency, to transmit the first peripheral select signal.

11. The system of claim 10 wherein the configuration register is further configured such that the count for the second address is based on the number of clock cycles, at the first clock frequency, to transmit the second peripheral select signal.

12. The system of claim 8, the configuration register further comprising:
    a multiplexer configured to receive the count and the second address; and
    a flip-flop coupled to the multiplexer and configured to hold the count, wherein the configuration register is configured to receive and transmit the count if the select signal matches an address other than the first address.

13. A method of selecting, in an integrated circuit, a first peripheral receiving a first clock cycle and a second peripheral receiving a second clock cycle, the method comprising:
   receiving the first clock cycle in a processing circuit;
   transmitting a select signal from the processing circuit;
   transmitting an address signal from the processing circuit;
   receiving the select and address signals at a bridge circuit, the bridge circuit comprising a counter and coupled to the processing circuit, the first peripheral and the second peripheral;
   determining whether the address signal is associated with the first or second peripheral;
   transmitting a first peripheral select signal to the first peripheral;
   processing a first count in the counter, the first count associated with the first peripheral;
   transmitting a second peripheral select signal to the second peripheral; and
   processing a second count in the counter, the second count associated with the second peripheral, wherein the second count differs from the first count and is predetermined.

14. The method of claim 13, further comprising: tracking passage of clock cycles based on the first clock frequency;
   asserting the first peripheral for a period of time based on the first count and the first clock frequency; and
   asserting the second peripheral for a period of time based on the second count and the first clock frequency.

15. The method claim 14 wherein a ratio of the period of time for which the first peripheral is asserted to the period of time for which the second peripheral is asserted is equal to a ratio of the first clock frequency to the second clock frequency.

16. The method of claim 14, further comprising:
   comparing the first count with the passage of clock cycles based on the first clock frequency; and
   comparing the second count with the passage of clock cycles based on the first clock frequency.

17. A system for selecting a peripheral, the peripheral receiving a first clock frequency, in an integrated circuit comprising:
   a processing circuit configured to receive a second clock frequency and transmit a select signal and an address signal, the first and second clock frequencies differing;
   a bridge circuit coupled to the processing circuit and the peripheral, and configured to receive the select and address signals and transmit a peripheral select signal to the peripheral, the bridge circuit further configured to receive the second clock frequency but not the first clock frequency, the bridge circuit comprising a counter,
   wherein the counter is configured to process a count, the count being a predetermined number and based on the ratio between the first clock frequency and the second clock frequency.

* * * * *